US012330970B2

(12) United States Patent
Martin (10) Patent No.: US 12,330,970 B2
(45) Date of Patent: *Jun. 17, 2025

(54) METHOD AND SYSTEM FOR THE REMEDIATION OF AQUATIC FACILITIES

(71) Applicant: Truox, Inc., Alpine, WY (US)

(72) Inventor: Roy W. Martin, Naples, FL (US)

(73) Assignee: Truox, Inc., Naples, FL (US)

( * ) Notice: Subject to any disclaimer, the term of this patent is extended or adjusted under 35 U.S.C. 154(b) by 432 days.

This patent is subject to a terminal disclaimer.

(21) Appl. No.: 17/988,963

(22) Filed: Nov. 17, 2022

(65) Prior Publication Data

US 2023/0080286 A1 Mar. 16, 2023

Related U.S. Application Data

(63) Continuation-in-part of application No. 17/866,823, filed on Jul. 18, 2022, now Pat. No. 12,286,370,
(Continued)

(51) Int. Cl.
*C02F 1/76* (2023.01)
*C02F 1/00* (2023.01)
(Continued)

(52) U.S. Cl.
CPC .............. *C02F 1/763* (2013.01); *C02F 1/008* (2013.01); *C02F 1/685* (2013.01);
(Continued)

(58) Field of Classification Search
CPC .... C02F 1/76; C02F 1/008; C02F 1/00; C02F 1/685; C02F 1/766; C02F 1/66;
(Continued)

(56) References Cited

U.S. PATENT DOCUMENTS

| 4,044,103 A | 8/1977 | Mollard |
| 4,224,154 A | 9/1980 | Steininger |

(Continued)

FOREIGN PATENT DOCUMENTS

| BR | 9605603 | 8/1998 |
| BR | 9605603 A1 | 8/1998 |

(Continued)

OTHER PUBLICATIONS

Written Opinion and search report issued in corresponding PCT/US2021/027441, Jul. 9, 2021, pp. 1-25.
(Continued)

*Primary Examiner* — Akash K Varma
(74) *Attorney, Agent, or Firm* — Jeffrey S. Melcher; Melcher Patent Law PLLC (57) ABSTRACT

A system and method for controlling the accelerated remediation of the water of an aquatic facility using at least one sanitizer sensor, a pH sensor, a temperature sensor and a chlorine dioxide sensor all interfaced with a programmable controller that is programmed to implement an accelerated remediation cycle and configured to calculate a Ct value of the water chemical feed system. The programmable controller activates a chemical feed system to supply an acid, an oxidizer and a chlorite ion donor to a conduit to form chlorine dioxide that is supplied to the water until a desire Ct value is reached.

52 Claims, 7 Drawing Sheets

Related U.S. Application Data which is a continuation-in-part of application No. 17/571,586, filed on Jan. 10, 2022, now Pat. No. 11,999,633, which is a continuation-in-part of application No. 17/205,316, filed on Mar. 18, 2021, now Pat. No. 12,037,263.

(60) Provisional application No. 63/013,007, filed on Apr. 21, 2020, provisional application No. 63/138,618, filed on Jan. 18, 2021.

(51) Int. Cl.
*C02F 1/68* (2023.01)
*C02F 103/42* (2006.01)

(52) U.S. Cl.
CPC .... *C02F 2103/42* (2013.01); *C02F 2209/005* (2013.01); *C02F 2209/02* (2013.01); *C02F 2209/06* (2013.01); *C02F 2209/29* (2013.01); *C02F 2303/04* (2013.01); *C02F 2303/18* (2013.01)

(58) Field of Classification Search
CPC .... C02F 1/68; C02F 1/70; C02F 1/686; C02F 1/763; C02F 2209/005; C02F 2209/06; C02F 2209/29; C02F 2209/04; C02F 2209/003; C02F 2209/006; C02F 2209/02; C02F 2209/05; C02F 2209/44; C02F 2303/04; C02F 2303/185; C02F 2103/42
USPC ............... 210/754, 96.1, 143, 739, 743, 742
See application file for complete search history.

(56) References Cited

U.S. PATENT DOCUMENTS

| | | | |
|---|---|---|---|
| 4,414,180 A * | 11/1983 | Fisher | C01B 11/024 422/186 |
| 4,456,511 A * | 6/1984 | Fisher | B01J 19/122 204/157.48 |
| 6,824,756 B2 | 11/2004 | Rosenblatt | |
| 6,855,294 B2 | 2/2005 | Taylor | |
| 7,261,821 B2 | 8/2007 | Beardwood | |
| 7,311,884 B2 | 12/2007 | Brownfield | |
| 7,407,641 B2 | 8/2008 | Cowley | |
| 7,465,412 B2 | 12/2008 | Pickens | |
| 7,504,074 B2 | 3/2009 | Martens | |
| 7,754,057 B2 | 7/2010 | O-Leary | |
| 7,833,392 B2 | 11/2010 | Nanjundiah | |
| 7,922,933 B2 | 4/2011 | Martin | |
| 7,927,509 B2 | 4/2011 | Martin | |
| 7,964,138 B2 | 7/2011 | Richrdson | |
| 7,976,725 B2 | 7/2011 | Martin | |
| 8,088,300 B2 | 1/2012 | Byrne | |
| 8,211,296 B2 | 7/2012 | Angelilli | |
| 9,175,208 B2 | 11/2015 | Thompson | |
| 9,521,841 B2 | 12/2016 | Goda | |
| 9,656,891 B2 | 5/2017 | Martin | |
| 9,675,065 B2 | 6/2017 | Martin | |
| 10,427,959 B2 | 10/2019 | Martin | |
| 10,669,173 B2 | 2/2020 | Fujiwara et al. | |
| 10,807,882 B2 | 10/2020 | Lawryshyn et al. | |
| 11,235,975 B2 | 2/2022 | Martin | |
| 11,535,541 B2 * | 12/2022 | Gupta | C01B 11/026 |
| 2002/0014463 A1 * | 2/2002 | Iverson | C02F 5/083 210/749 |
| 2006/0088498 A1 | 4/2006 | Martin | |
| 2006/0131245 A1 * | 6/2006 | Dennis, II | C02F 1/008 210/746 |
| 2007/0193958 A1 | 8/2007 | Martin | |
| 2010/0189630 A1 * | 7/2010 | Martin | C01B 11/024 423/477 |
| 2011/0000860 A1 * | 1/2011 | Bland | C01B 11/024 204/157.48 |
| 2011/0288049 A1 * | 11/2011 | Blandford | A01N 59/00 252/175 |
| 2012/0207858 A1 | 8/2012 | Martin | |
| 2013/0126403 A1 | 5/2013 | Kilawee | |
| 2013/0334113 A1 | 12/2013 | Erlich | |
| 2014/0322349 A1 | 10/2014 | Martin | |
| 2015/0041136 A1 | 2/2015 | Martin | |
| 2015/0060370 A1 | 3/2015 | Martin | |
| 2015/0065403 A1 | 3/2015 | Martin | |
| 2015/0196027 A1 | 7/2015 | Martin | |
| 2015/0216874 A1 | 8/2015 | Martin | |
| 2016/0032173 A1 | 2/2016 | Martin | |
| 2017/0105412 A9 | 4/2017 | Martin | |
| 2018/0099882 A1 | 4/2018 | Martin | |
| 2019/0055146 A1 | 2/2019 | Ecolab | |
| 2019/0187089 A1 | 6/2019 | Endress | |
| 2019/0194047 A1 | 6/2019 | Martin | |
| 2019/0300398 A1 * | 10/2019 | Martin | C02F 1/32 |
| 2020/0123033 A1 | 4/2020 | Martin | |
| 2020/0239240 A1 | 4/2020 | Martin | |
| 2020/0189944 A1 | 6/2020 | Martin | |
| 2020/0239340 A1 | 7/2020 | Martin | |
| 2020/0319621 A1 | 10/2020 | Roy | |
| 2020/0346948 A1 | 11/2020 | Martin | |
| 2020/0354218 A1 | 11/2020 | Martin | |
| 2021/0323838 A1 | 10/2021 | Martin | |
| 2022/0127164 A1 | 4/2022 | Martin | |
| 2022/0240506 A1 | 8/2022 | Martin | |
| 2023/0144546 A1 | 5/2023 | Potucek | |

FOREIGN PATENT DOCUMENTS

| | | |
|---|---|---|
| CA | 2765637 | 7/2013 |
| CA | 3180548 A1 | 10/2021 |
| CA | 3206777 A1 | 7/2022 |
| CN | 202758205 | 2/2013 |
| CN | 202758205 A | 2/2013 |
| WO | 2021/216347 | 10/2021 |
| WO | 2022/155104 | 7/2022 |

OTHER PUBLICATIONS

EPA Technical Guidance Manual, Disinfection Profiling and Benchmarking, Office of Water, EPA 815-R-20-003, Jun. 2020, pp. 1-162.
European Search Report issued in European Patent Application No. 21793364.7, Jan. 31, 2024, pp. 1-9.
Chlorine Contact Time for Small Water Systems, Washington State Department of Health, 2 pages (Year: 2016).
Written Opinion and search report issued in PCT/US2022/011892, Mar. 22, 2022, pp. 1-13.
Written Opinion and search report issued in PCT/US2024/27862, Nov. 15, 2023, pp. 1-16.

* cited by examiner

METHOD AND SYSTEM FOR THE REMEDIATION OF AQUATIC FACILITIES

FIELD OF INVENTION

The invention relates to a method and system for accelerated remediation of the water of an aqueous system, such as an aquatic facility, using a programmable controller programmed to implement a remediation cycle that accelerates the in-situ generation of chlorine dioxide and configured to calculate a Ct value, track the Ct value in real-time and continue the remediation until a target Ct value is achieved.

BACKGROUND

Free chlorine and free bromine are common sanitizers for the treatment of aquatic facilities. While effective at controlling bacteria counts in the water, they have limited efficacy against waterborne pathogens that are resistant to the sanitizers such as *Cryptosporidium*.

The Centers for Disease Control and Prevention has reported waterborne pathogens such as *Cryptosporidium* are accountable for nearly 80% of all Recreational Water Illness (RWI) in the United States. To a lesser degree but still significant are other waterborne pathogens such as *Legionella* that are resistant to chlorine due to the formation of biofilm that protect the bacteria from the chlorine.

Chlorine dioxide is favored over many oxidizing biocides due to its biocide efficacy over a broad pH range, low use rate, biofilm penetration and high selectivity in contaminated water.

In order to ensure aquatic facilities are properly protected from waterborne pathogens, there is a need for controlling two types of applications used for remediating. The first is a daily remediation and the second is a rapid recovery shock.

Daily remediation is necessary due to the fact that aquatic facilities that have been compromised by a waterborne pathogen such as *Cryptosporidium* will not know they have been compromised until symptoms are identified and confirmed often many days or even weeks later. By the time confirmation is made, the pathogen can spread to hundreds or even thousands of people who used the aquatic facility and/or have spread the pathogen to other aquatic facilities thereby propagating the spread of infection. Implementing an automated system that remediates the aquatic facility on a daily basis would dramatically reduce the potential for infection as well as virtually eliminate the spread to other aquatic facilities.

Rapid recovery shock is applied when a known event such as a fecal release is identified. The control system can be manually activated to implement a remediation cycle, track the Ct value in near real-time, and terminate the remediation cycle when the targeted Ct value has been achieved. Furthermore, the control system can then be programmed to neutralize excess treatment (e.g. chlorine dioxide and/or excess sanitizer) after achieving the target Ct value to prepare the aquatic facility for opening to the public.

U.S. Pat. Nos. 7,922,933, 7,927,509, and 7,976,725 which are herein incorporated by reference in their entirety, disclose a cyclic process for the in-situ generation of chlorine dioxide. The cyclic process utilizes bromide ions that are activated by an oxidant to produce free bromine. The free bromine oxidizes chlorite ions producing chlorine dioxide. Chlorine dioxide inactivates microbiological organisms (i.e. *Cryptosporidium*). During this process the free bromine and at least some portion of the chlorine dioxide are reduced back to bromide ions and chlorite ions respectively which are recycled back to free bromine and chlorine dioxide utilizing the cyclic process.

My earlier U.S. Published Patent Application Nos. 2019-0300398 and 2020-0346948, which are herein incorporated by reference in their entirety, disclose methods for in-situ generation and stabilization of chlorine dioxide in the water of an aquatic facility using UV activation of chlorite ions.

My earlier U.S. Published Patent Application Nos. 2021-0323838 and 2022-0127164, which are herein incorporated by reference in their entirety, disclose methods for in-situ generation and stabilization of chlorine dioxide in the water of an aquatic facility.

There is a need for an improved method of generating chlorine dioxide to remediate the water of an aquatic facility without the use of bromine.

SUMMARY OF THE INVENTION

Objectives of the invention include mitigating over 80% of all Recreational Water Illness (RWI) as described by the Centers for Disease Control and Prevention, without the use of bromine.

The objectives of the invention and other objectives can be obtained by a first embodiment which comprises a method for accelerating remediation of a main body of water in an aquatic facility, the method comprising:
  calculating a Ct value of the water by a programmable controller;
  activating chemical feed systems by the programmable controller so that the chemical feed systems deliver an acid, an oxidizer and a chlorite ion donor to a conduit in communication with the water;
  allowing the acid, the oxidizer and chlorite ion donor to react in the conduit and form chlorine dioxide; and
  supplying the chlorine dioxide from the conduit to the water; and
  sustaining a concentration of chlorine dioxide in the water until a targeted Ct value of the water is reached to achieve remediation of the water.

The objectives of the invention and other objectives can be obtained by a second embodiment which comprises a system for controlling the accelerated remediation of a main body of water in an aquatic facility, the system comprising:
  at least one sanitizer sensor for measuring a concentration of sanitizer in the water;
  a pH sensor for measuring a pH of the water;
  a temperature sensor for measuring a temperature of the water;
  a chlorine dioxide sensor for measuring the concentration of chlorine dioxide in the water;
  chemical feed systems for supplying an acid, an oxidizer and a chlorite ion donor to a conduit connected to the water;
  a programmable controller in communication with the sanitizer sensor, the pH sensor, the temperature sensor, the chlorine dioxide sensor, and the chemical feed systems;
  the programmable controller is programmed to implement an accelerated remediation cycle by activating the chemical feed systems to achieve localized high concentrations of the acid, the oxidizer and the chlorite ion donor which react to form chlorine dioxide in the conduit that is supplied to the water;
  the programmable controller is programmed to record a chlorine dioxide concentration measured by the chlorine dioxide sensor;

the programmable controller is programmed to calculate a Ct value of the water; and the programmable controller is programmed to sustain a concentration of chlorine dioxide in the water until a targeted Ct value is reached to achieve remediation.

The system in accordance with the second embodiment further comprises the programmable controller terminating the remediation cycle by applying reducing agent to neutralize excess chlorine dioxide and sanitizer in the water.

The programmable controller calculates, records, and stores the Ct value of the water. The programmable controller can also display the Ct value. The programmable controller can be programmed to forecast the time to achieve the desired Ct value of the water. The calculated Ct value can be based on the rolling average of the chlorine dioxide concentration. The Ct value is calculated at any desired interval, for example every 0.1 to 60 minutes. The Ct value can be calculated by:

$$Ct\ value=[(\Sigma X_n) \div n] \times T$$

Where:

"$X_n$" is the chlorine dioxide concentration in mg/l (or ppm) recorded at a point in time since beginning the remediation cycle.

"n" is the number of chlorine dioxide values recorded over a period of time since beginning the remediation cycle.

"T" is the period of time (minutes) that has lapsed since beginning the remediation cycle.

Any suitable sanitizer sensor can be utilized, such as an ORP sensor or an amperometric sensor. The system preferably utilizes both ORP and amperometric sensors.

The implementation of the accelerated remediation cycle can be initiated automatically or manually, as desired. The programmable controller can be programmed to terminate the remediation cycle at a desired time.

Chlorine dioxide is produced within the conduit using relatively dilute concentrations of chlorite. When the accelerated remediation cycle is initiated by the programmable controller, the controller activates the chemical feed systems to achieve localized high concentrations of chemicals in the conduit. The localized high concentration of chemicals react resulting in efficient conversion of chlorite to chlorine dioxide in the conduit.

The chemicals comprise a source of free chorine, and acid source and a chlorite source. The concentration of free chlorine (as $Cl_2$) and chlorite (as $ClO_2^-$) are in a molar ratio of between 0.5:2 to 3:1, more preferred 0.75:2 to 2:1 and most preferred 1:2 to 1:1 respectively.

The acid should be applied at a sufficient concentration to achieve a pH in the conduit of between 2 to 6.5, more preferably 2.5 to 6 and most preferred 3 to 5.5. A pH sensor can optionally be inserted into the conduit downstream of the acid feed point and be interfaced with the programmable controller. The programmable controller can then adjust the feed rate of acid to achieve a targeted pH.

The molar ratio of chlorine to chlorite and pH can be optimized based on the lapsed time between the location of chemical feed to the time the water in the conduit is injected into the pool. The longer the lapsed time the more reaction time there is to in-situ generate chlorine dioxide. In the case of shorter lapsed time periods, it may be advantageous to apply a higher molar ratio of chlorine to chlorite and lower the pH to below 5.5 to maximize the concentration of hypochlorous acid thereby increasing the rate of reaction and subsequent formation of chlorine dioxide.

Optimizing the molar ratio of chlorine to chlorite and pH has demonstrated the ability to achieve a conversion of chlorite to chlorine dioxide of ≥70%, more preferred ≥80% and most preferred ≥90% conversion. The demonstrated ability to achieve high conversion of chlorite to chlorine dioxide in dilute solutions achieved within the conduit of the circulating system of a swimming pool provides a means of remediating the swimming pool safely and cost effectively without the need for costly and potentially dangerous chlorine dioxide generators.

Figure 3:
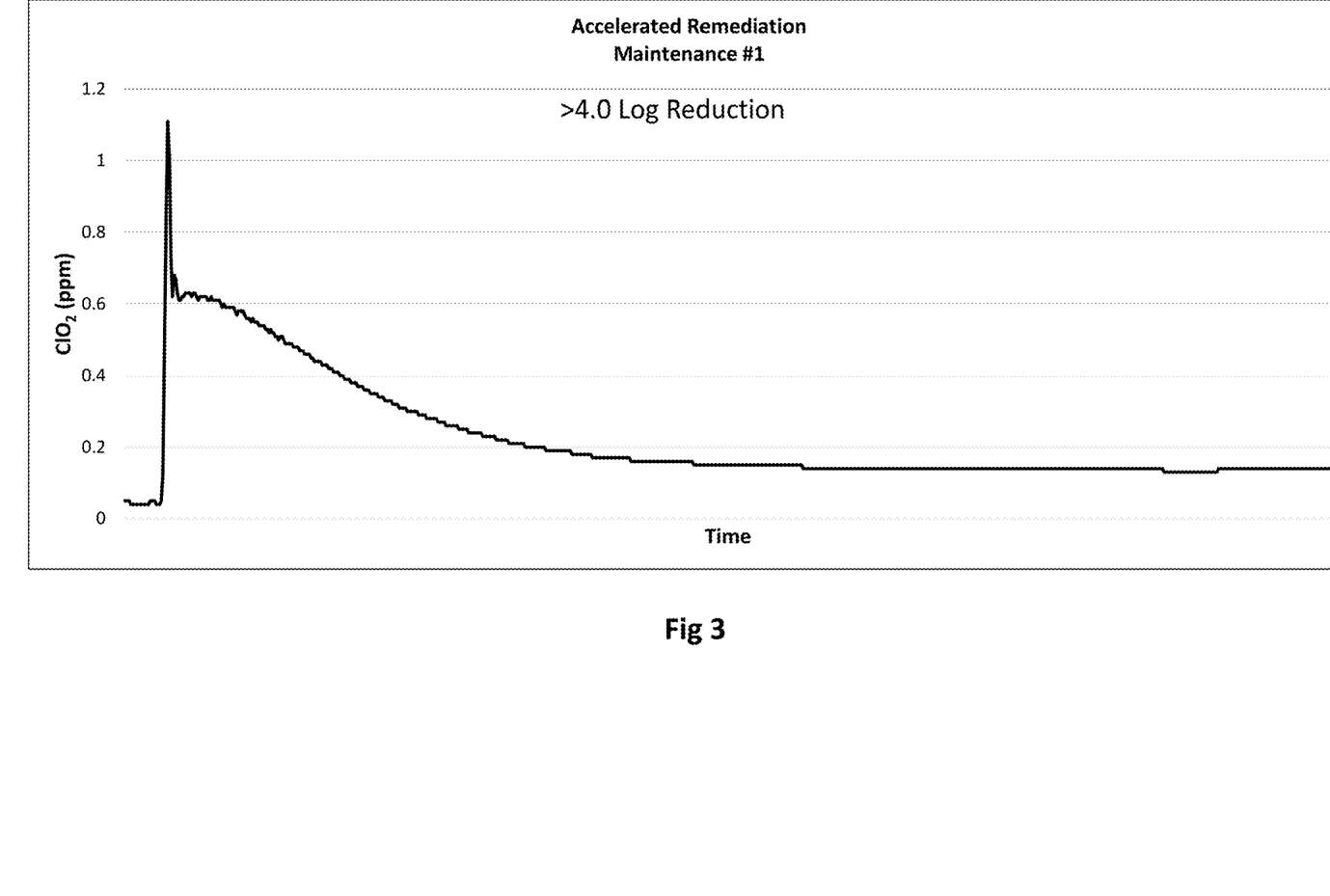
FIG. 3 and FIG. 4 illustrate data obtained in field studies for remediating *Cryptosporidium parvum* in a 15,000 gallon swimming pool using the disclosed inventions comprising the method for accelerated remediation and system. In both cases, samples collected using ultrafiltration to concentrate the oocyst demonstrated a >4.0 log reduction in *Cryptosporidium* viability. Furthermore, the reproducibility in the $ClO_2$ data and remediation performance clearly illustrates the benefits obtained by implementing the invention. Evening remediation uses a low dose of chlorite to achieve remediation when the pool is closed thereby achieving high levels of remediation efficacy with low cost.
Figure 4:
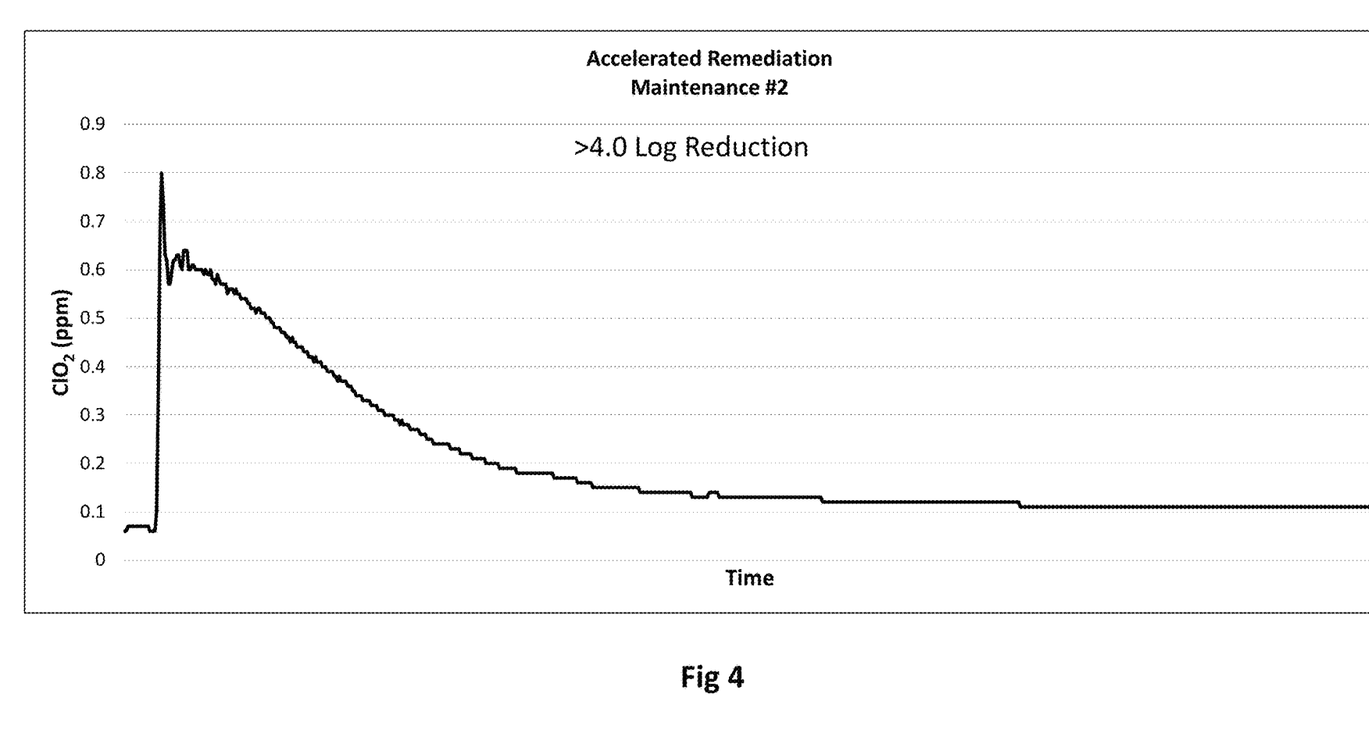
Figure 5:
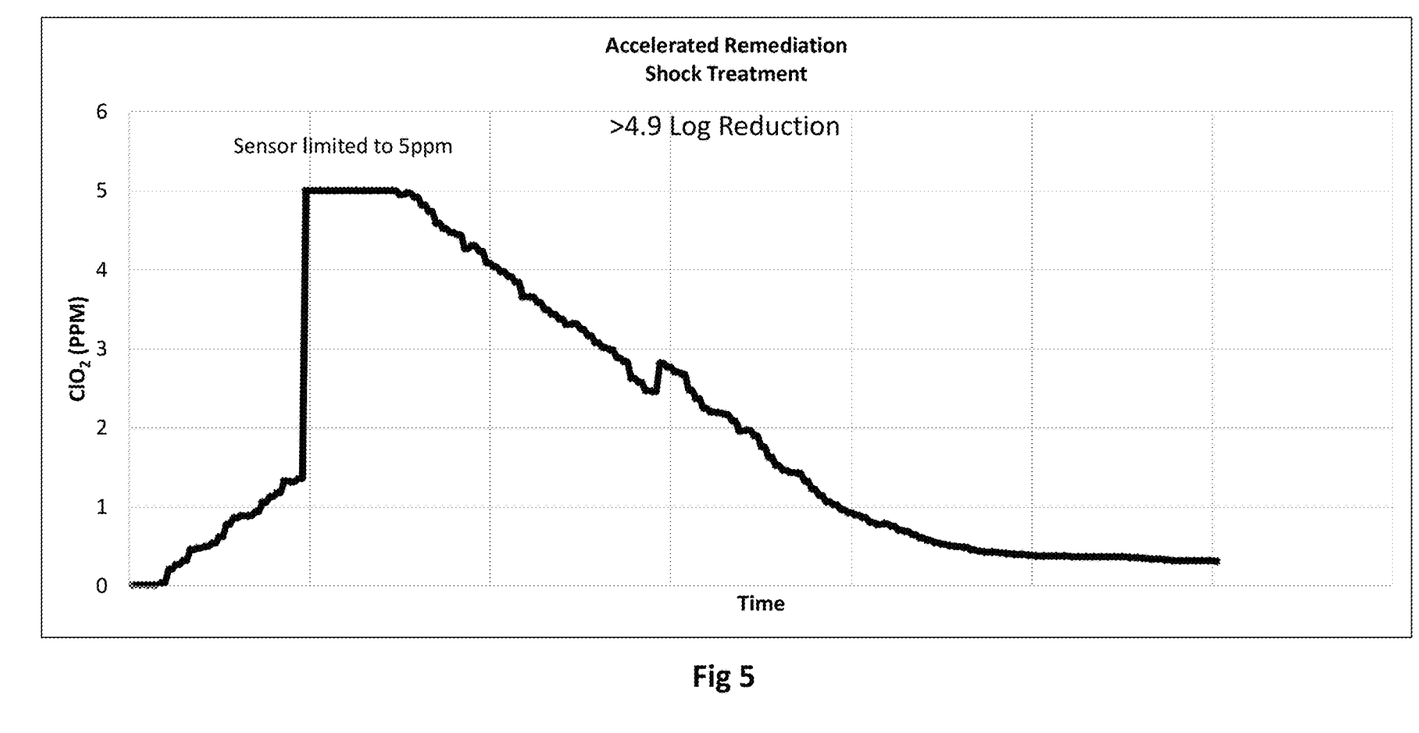
FIG. 5 illustrates data obtained in field studies for remediating *Cryptosporidium parvum* in a 15,000 gallon swimming pool implementing a Rapid Recovery Shock during daytime hours. This treatment method exemplifies the method employed to recover an aquatic facility quickly after a known event such as a fecal release. The rapid increase is $ClO_2$ concentrations is illustrated resulting from the in-situ generation of $ClO_2$ within the conduit of the circulating system.

By producing high concentrations of in-situ generated chlorine dioxide within the conduit, the process can be carried out safely without the need for expensive or potentially dangerous chlorine dioxide generators. Furthermore, as illustrated in FIGS. 3,4 and 5, the remediation cycle is accelerated due to the rapid buildup of chlorine dioxide in the water. The rapid buildup of chlorine dioxide results in a reduction in the time required to achieve the target Ct value thereby accelerating the remediation cycle.

The system can further comprise neutralizing excess chlorine dioxide and/or neutralizing excess sanitizer and/or oxidizer by applying a reducing agent to the water from a reducing agent feed system.

The programmable controller can be programmed to evaluate previous remediation cycles to determine the required application rate of chlorine dioxide to forecast future remediation cycles.

BRIEF DESCRIPTION OF THE DRAWINGS

In FIG. 5, the $ClO_2$ sensor range was limited to 5 ppm which explains the plateau as the $ClO_2$ concentration continued to rise. The results demonstrated >4.9 log reduction in viable *Cryptosporidium*.

DETAILED DESCRIPTION OF THE INVENTION

Figure 1:
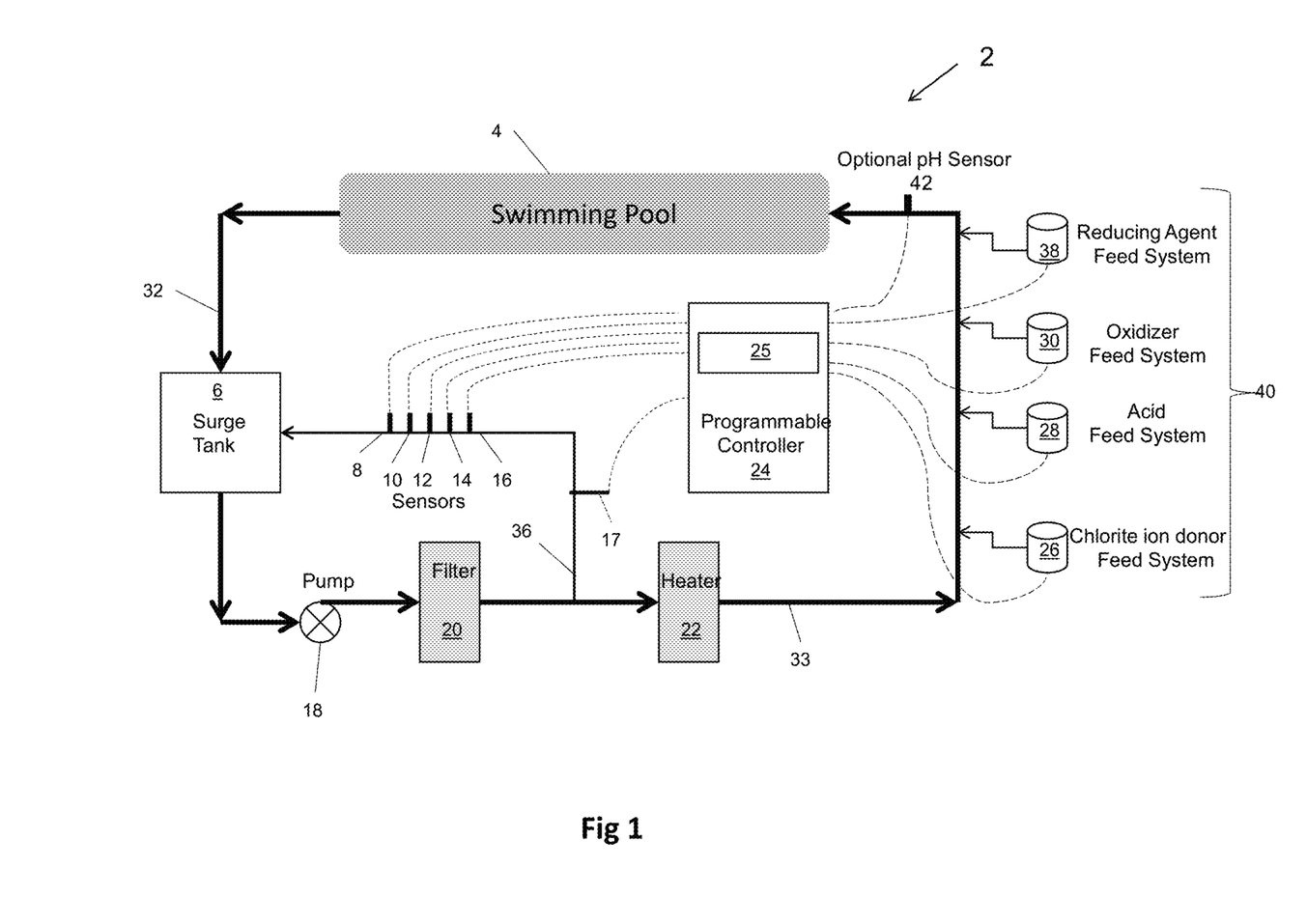
FIG. 1 illustrates a remediation system for remediating the water of an aquatic facility.
Figure 2:
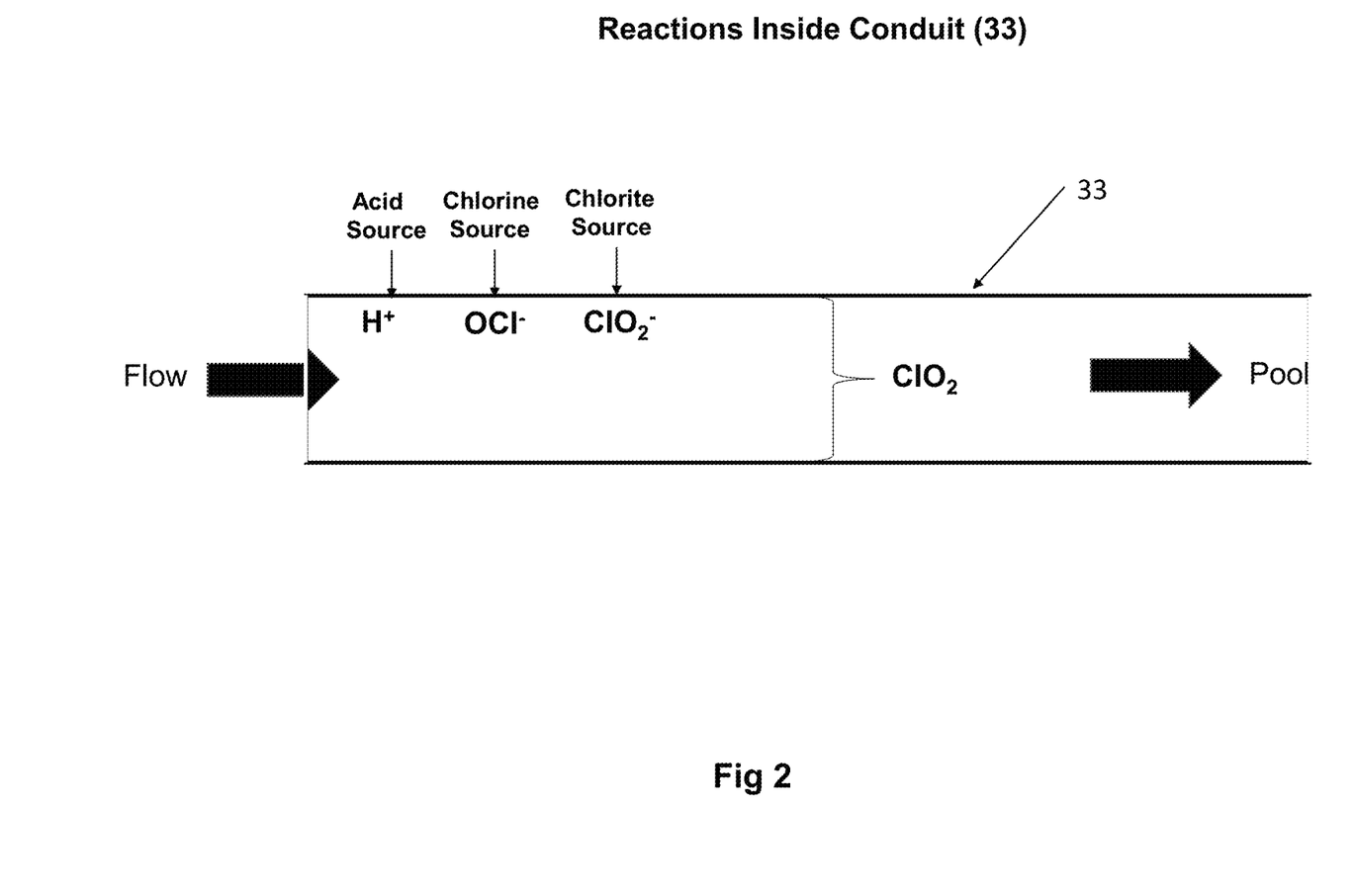
FIG. 2 illustrates the reactions within the conduit resulting in the in-situ generation of chlorine dioxide.

The invention will be explained with reference to attached non-limiting FIGS. FIG. 1 illustrates an exemplary remediation system 2 for remediation of the water 4 in an aquatic facility. In an aquatic facility, the water 4, such as in a swimming pool, typically flows out of the pool through exit conduit 32 to a surge tank 6, water pump 18, filter 20, heater 22, and then back into the pool via return conduit 33. A chemical feed system 40 is connected to the water 2, such as through the conduit 32. Examples of chemical feed systems 40 include a oxidizer feed system 30 for supplying sanitizer and oxidizer to the water 4, an acid feed system 28 for supplying chemicals to adjust or control the pH of the water 4, a chlorite ion donor feed system 26 for supplying chlorite ions to the water 4, and an optional reducing agent feed system 38 for supplying a reducing agent or other chemicals to the water 4.

A first sanitizer sensor 8 and a second sanitizer sensor 10 can be used measure the concentration of sanitizer in the water 4. For example, the first sanitizer sensor 8 can be an ORP senor and the second sanitizer sensor 10 can be amperometric type sensor. A pH sensor 12 can be used to measure the pH of the water 4. A chlorine dioxide sensor 14 can be used to measure the concentration of chlorine dioxide in the water 4. A temperature sensor 16 can be used to measure the temperature of the water 4. A flow sensor 17 can be used to measure the water flow through the conduit 36 from which the sensors 8, 10, 12, 14, 16 and 17 are connected to sample the water 4.

A programmable controller 24 is used to control the system 4. The remediation feed system 26, the acid feed system 28 and the oxidizer/sanitizer feed system 30 can be connected to and controlled by the programmable controller 24. The sensors 8, 10, 12, 14, 16 and 17 can be connected to and controlled by the programmable controller 24.

The Florida Department of Health pH range for the water 4 of an aquatic facility is from 7.2 to 7.8 with the recommended range being 7.4 to 7.6. During a remediation cycle, the programmable controller 24 automatically monitors and controls the pH to operate within these ranges using the pH sensor 12 and acid feed system 28. Due to the significant lag time between the time of feeding pH related chemicals (i.e. acid) from the acid feed system 28 and the time to return a representative sample for the pH sensor 12 to measure, control logic is used to minimize the potential for overfeed of the chemical. Examples of control logic is on/off control and time-proportioned control.

The Florida Department of Health Sanitizer range for chlorine (reported as $Cl_2$) sanitizer is from 1-10 ppm in pools and 2-10 ppm in spas. For bromine (reported as $Br_2$) the ranges is 1.5-10 ppm in pools and 3-10 ppm in spas. During a daily remediation cycle the programmable controller will automatically control the feed of sanitizer within these ranges using the first and second sanitizer sensors 8 and 10 and sanitizer feed system 30. However, during a rapid recovery shock, the range of chlorine will be 1-50 ppm as $Cl_2$ in the case of chlorine and 2-100 ppm as $Br_2$.

During the remediation cycle the chlorine dioxide concentration, measured by the chlorine dioxide sensor 14, can vary based on the type of remediation. For a daily remediation cycle, the chlorine dioxide concentration can range from 0.0 to 2.0 ppm as $ClO_2$. When the remediation cycle begins, the chlorine dioxide concentration at Time=0 is typically 0.0 ppm. Over time the concentration of chlorine dioxide will increase. The desired maximum concentration is dependent on the time constraints to achieve the desired Ct value. When longer times are permitted such as in the case of an evening remediation when the aquatic facility is closed to the public, the concentration of chlorine dioxide maybe as low as 0.1 ppm as $ClO_2$. In the event of a rapid recovery shock, it may be more desirable to increase to concentration in the water as high as 20 ppm as $ClO_2$ to minimize the time the aquatic facility is closed to the public. Regardless of the range or concentration of chlorine dioxide achieved, as long as the desired Ct value is achieved then remediation has been achieved.

Figure 6:
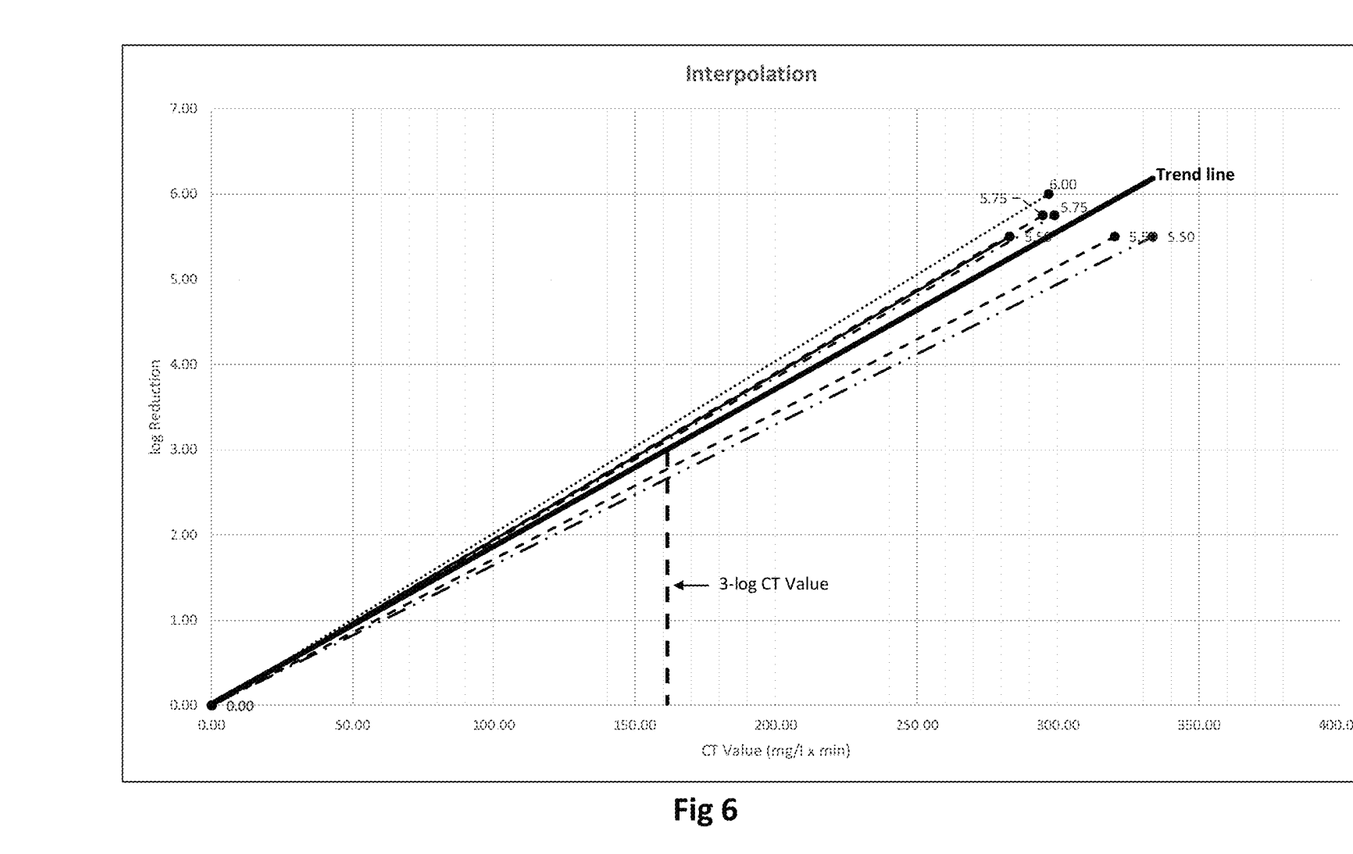
FIG. 6 illustrates the Ct values (min×mg/l) for achieving 3-log reduction in viable *Cryptosporidium* resulting from accelerated remediation for the in-situ generation of chlorine dioxide.

The Ct value (min×mg/l) can range from 1-500, more preferred 2-300, and most preferred 3-200. The optimum Ct value will depend on what is being remediated and the method of remediation being used. Referring to FIG. 6 the chart illustrates the log reduction for *Cryptosporidium* for various Ct values using the method of accelerated remediation for the in-situ generation of chlorine dioxide. Depending on the method used the Ct value required to remediate the *Cryptosporidium* (3-log reduction) varied. In the case of penetrating and removing biofilm in the piping of an aquatic facility the Ct value may be higher depending on the thickness and surface area covered by the biofilm.

The programmable controller 24 tracks the chlorine dioxide concentration measured by the chlorine dioxide sensor 14 during the remediation cycle and calculates the rolling average (also referred to as a "moving average"). The rolling average is multiplied by the time that has lapsed measured in minutes to update the Ct value in real-time. The rolling average can be updated over any desired period of lapsed time. One preferred period of lapsed time ranges from 0.1 to 60 minutes, more preferred 0.2 to 30 minutes, and most preferred 0.5 to 10 minutes. The ability to frequently update the real-time Ct value allows the programmable controller to forecast the trend and project when the targeted Ct value will be reached.

The ability to forecast when a remediation will be achieved, the programmable controller 24 can be programmed to learn from the previous remediation cycles and project and/or automatically adjust the concentration of chlorine dioxide and/or the application rate of chlorine dioxide in future remediation cycles to achieve a targeted Ct value within a desired time interval. For example, when using time-proportioned control logic, the controller 24 alters the feed duration of chlorine dioxide from the remediation feed system 26 based on how far the measured concentration of chlorine dioxide measured by the sensor 14 is from the set-point. If the sun's UV for example decomposes the chlorine dioxide at a high rate, the time required to achieve Ct value can be substantially increased. By evaluating the number of feed cycles, duration of the feed cycles, and the deviations from the set-point during and after said feed cycles, corrections can be made to compensate for the losses in chlorine dioxide concentration as well as the lag-times between applying chlorine dioxide and observing (measuring) the result.

The remediation cycle can comprise a single application of chlorine dioxide. For example, referring to FIGS. 3 and 4 illustrate that a single application of sodium chlorite under the brand name Cryptolyte® provided sufficient chlorine dioxide using in-situ generation to achieve a >3-log reduction in *Cryptosporidium* in the evening hours when the pool was closed. The remediation cycle can also be controlled using on/off control to target and sustain a chlorine dioxide setpoint until reaching a target CT Value. On/off control would be suitable for an aquatic facility with limited downtime before re-opening. By achieving and sustaining a targeted chlorine dioxide setpoint the CT Value is achieved in a shorter period of time compared to a gradual declining chlorine dioxide concentration resulting from a single application of chlorine dioxide.

The remediation cycle may also apply multiple applications of chlorine dioxide. For example, when the remediation cycle is initiated the programmable controller 24 can control the concentration of chlorine dioxide by applying multiple applications of chlorine dioxide to sustain a pre-determined set-point of chlorine dioxide. The programmable controller 24 an apply an initial application of chlorine dioxide at a predetermine concentration, then implement periods of additional applications of chlorine dioxide to target a predetermined set-point. Control logic can be used to compensate for lag-time between application of treatment and detection of the applied treatment. On/off control or time-based proportional control provides a method of compensating for the lag-time.

The remediation cycle can be automatically initiated by the programmable controller 24 such as in the case of planned evening remediation when the aquatic facility is closed to the public. However, in the case of a fecal release, the remediation cycles can be initiated manually, then carry out the functions automatically to perform the remediation.

The programmable controller 24 can be configured to calculate, record, and store the Ct value. Optionally the controller 24 can display the Ct value on the display 25 and callout to a technician in the event of a successful or failed remediation cycle. Once the Ct value has been achieved, the controller 24 terminates the remediation cycle.

The accelerated remediation cycle can be automatically initiated by the programmable controller 24 such as in the case of planned evening remediation when the aquatic facility is closed to the public. However, in the case of a fecal release, the accelerated remediation cycle can be initiated manually, then carry out the functions automatically to perform the accelerated remediation. An accelerated remediation cycle can be implemented by the programmable controller activating simultaneously the chlorite ion donor feed system 26, oxidizer feed system 30 and acid feed system 28. Acid is typically desired to accelerate the rate of reaction by lowering the pH favoring the formation of hypochlorous acid, however if a separate acid-based oxidizer exemplified by potassium monopersulfate or electrolysis of chloride salts is used, acid may not be required or may be significantly reduced. The simultaneous chemical feeds achieve localized high concentrations in the conduit. Fluid dynamics within the conduit combine the high concentrations of chemicals to induce a high rate of reaction resulting in elevated concentrations of chlorine dioxide in the conduit. The ability to rapidly increase the concentration of chlorine dioxide in the water of the aquatic facility accelerates the completion of the remediation cycle. The optimization of acid feed may be further improved by implementing a pH sensor into the conduit 42 that is in fluid contact with the programmable controller that can automatically adjust the acid feed 28.

When a targeted Ct value is achieved and the remediation cycle is terminated, adjustments to the water 4-chemistry may be required before opening the aquatic facility to patrons. In some cases such as a rapid recovery shock, excess sanitizer and chlorine dioxide can make the water unsuitable to swimmers. Neutralizing the excess sanitizer and chlorine dioxide can be automated by the system. The amperometric sensor 10 measures the excess chlorine as well as chlorine dioxide. The chlorine dioxide sensor 14 measures specifically chlorine dioxide. The difference between the two sensors 10 and 14 provides a relative concentration of sanitizer.

A reducing feed system 38 interfaced with the programmable controller 24 and in fluid contact with the water 4 of the aquatic facility provides the ability to feed a reducing agent exemplified by sodium thiosulfate in order to neutralize the excess oxidizers (sanitizer etc.), or any other desired chemicals. Furthermore, knowing the strength of the sodium thiosulfate solution, the feed rate of the chemical feed system 40, the volume of water to be treated etc., the programmable controller 24 can be programmed to calculate how much reducing agent to apply, then track the reductions in excess and adjust as needed until the water meets the water chemistry requirements to open.

The following terms used throughout the specification have the following meanings unless otherwise indicated.

"A" or "an" means "at least one" or "one or more" unless otherwise indicated.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

As used herein, the term "aquatic facility" is used with reference to all structural components and equipment comprising an aqueous system used by humans for exercise, sports and/or recreation. Examples of aquatic facilities include but are not limited to: residential swimming pools, water parks, theme parks, swimming pools, spas, therapy pools, hot tubs and the like.

As used herein, the term "aqueous system" describes a body of water 4 that can be treated using the disclosed composition. Examples of aqueous systems include recreational water, cooling towers, cooling ponds and wastewater.

As used herein, "recreational water" is water 4 used by mammals (i.e. humans) for various activities such as swimming, exercise, water sports, recreation, physical therapy and diving. Examples of aqueous systems comprising recreational water include: swimming pools, hot tubs, feature pools, spas, water-park rides, therapy pools, diving wells etc.

As used herein the term "Ct value" is defined as the product of the average concentration of chlorine dioxide (mg/l) and time (minutes) of exposure to the chlorine dioxide. For example, if the average chlorine dioxide concentration of $ClO_2$ is determined to be 2.2 mg/l over a 20 minute period of time, the Ct value is calculated by multiplying the average concentration of chlorine dioxide by the time.

$$Ct\ value = 2.2 mg/l \times 20\ min$$

$$Ct\ value = 44 (min \times mg/l)$$

The Ct value can be targeted based on laboratory and/or field studies to achieve the desired level of inactivation. Comparatively, low Ct values (i.e. Ct=1 mg·min/l) may achieve a 6-log reduction in bacteria like *E. coli*, while higher Ct values (i.e. Ct=90 mg·min/l) may be required to reduce a parasite like *Cryptosporidium* by 3-log.

As used herein, "algorithm to calculate the Ct value" describes a mathematical equation for calculating the Ct value in near real-time. One example of a suitable algorithm for calculating the Ct value follows:

$$Ct\ value = [(\Sigma X_n) \div n] \times T$$

Where:
"$X_n$" is the chlorine dioxide concentration in mg/l (or ppm) recorded at a point in time since beginning the remediation cycle.

"n" is the number of chlorine dioxide values recorded over a period of time since beginning the remediation cycle.

"T" is the period of time (minutes) that has lapsed since beginning the remediation cycle.

The algorithm calculates the Ct value over the period of the remediation cycle. The algorithm calculates the sum of all the chlorine dioxide values recorded. The sum is divided by the number of chlorine dioxide values to obtain the average chlorine dioxide concentration. The average chlorine dioxide concentration is then multiplied by the lapsed time (minutes) to calculate the Ct value (mg/l×min). The Ct value is updated in real-time by calculating the rolling average of the chlorine dioxide concentration, then multiplying the rolling average by the lapsed time (minutes) since beginning the remediation cycle.

As used herein, "rolling average" is the average chlorine dioxide concentration resulting from the accumulated (sum) chlorine dioxide concentrations (mg/l) divided by the number of chlorine dioxide measurements by the chlorine dioxide sensor 14 and recorded. The rolling average is used to provide a real-time Ct value by multiplying the rolling average by the remediation cycle's lapsed time (i.e. number of minutes since beginning the remediation cycle). The rolling average can be updated over any desired period of lapsed time. One preferred period of lapsed time ranges from 0.1 to 60 minutes, more preferred 0.2 to 30 minutes, and most preferred 0.5 to 10 minutes.

As used herein, the term "remediation cycle" describes the process of in-situ generating chlorine dioxide within the conduit 33 and introducing the chlorine dioxide into the water of an aquatic facility to obtain a targeted Ct value (min×mg/l) to achieve remediation. The chlorine dioxide can be introduced to the water 4 from the remediation feed system 26 using in-situ generation.

As used herein, "accelerated remediation" describes the ability to reduce the time required to achieve the target Ct value for remediation by increasing the concentration of chlorine dioxide in the water of an aquatic facility using in-situ generation of chlorine dioxide within the conduit of the circulating system. The time required to achieve remediation is dramatically reduced compared to the time required using the cyclic process disclosed in U.S. Pat. Nos. 7,922,933, 7,927,509, and 7,976,725. For the in-situ generation of chlorine dioxide in dilute solutions. Localized high concentrations of reactants and optimized molar ratios of chlorine ($Cl_2$) and chlorite ($ClO_2^-$) result in high efficiency conversion of chlorite to chlorine dioxide. Accelerated remediation dramatically reduces the time required to achieve the CT Value necessary for remediation compared to that achieved using the prior art cyclic process.

As used herein, "accelerated remediation cycle" describes delivering chemicals for the in-situ generation of chlorine dioxide into a conduit 33 to achieve localized high concentrations to accelerate the remediation cycle. The localized high concentrations of chemicals interact resulting in higher concentrations of chlorine dioxide within the conduit. By accelerating the production rate of chlorine dioxide, the concentration of chlorine dioxide in the water of the aquatic facility is elevated in a short period of time when compared to in-situ generation using dilute concentrations of chemicals disclosed in the prior art. The rapid elevation of chlorine dioxide in the water dramatically accelerates the remediation process by reducing the time required to achieve the targeted Ct value. Furthermore, the accelerated remediation cycle is controlled by a programmable controller that activates the feed of the chemicals at essentially the same time to achieve the localized high concentrations in the conduit. The remediation cycle continues until at least the targeted (desired) Ct value is achieved. Combining a system comprising a programmable controller to control the remediation cycle with the synergistic chemistries to accelerate the in-situ generate chlorine dioxide, the CT Value required to achieve remediation is achieved at an accelerated pace.

As used herein, "localized high concentrations" refers to the concentration of chemicals used for the generation of chlorine dioxide within the conduit. The volume of water in the conduit is only a small portion of the volume of water in the swimming pool. When the said chemicals are applied to the conduit, the concentration in the conduit may be 100's of times higher than what will be achieved once the chemicals are dispersed in the large volume of water in the swimming pool. For example, a 100,000 gallon swimming pool is required to have a turnover every 6 hours or less to meet typical Dept of Health codes. A circulation rate of approximately 280 gpm is required. If the programmable controller is programmed to feed sufficient chemical to produce 5 ppm as $ClO_2$ based on the volume of water in the pool and the chemicals are feed over three minutes, the localized high concentrations within the conduit are sufficient to produce approximately 119 ppm as $ClO_2$. By utilizing the cyclic process, high conversion efficiency can be achieved without the use of a chlorine dioxide generator.

Figure 7:
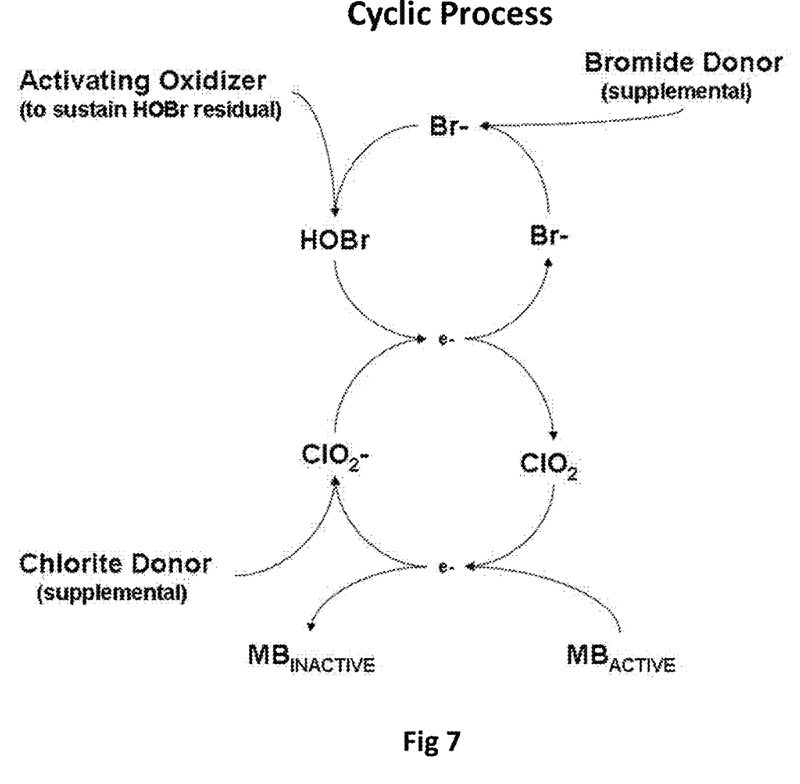
FIG. 7 illustrates a cyclic process for the in-situ generation of chlorine dioxide disclosed in the referenced prior art.

As used herein, the term "cyclic process" describes the in-situ generation of chlorine dioxide resulting from the recycling of substantially inert anions comprising bromide and chlorite into their oxyhalogen surrogates, exemplified by hypobromous acid and chlorine dioxide respectfully followed by reduction back to their respective anions, and where the process is repeated (FIG. 7). The cyclic process comprises activating bromide ions with the oxidant to produce free bromine, the free bromine oxidizes chlorite ions to produce chlorine dioxide, reducing at least some free bromine back to bromide ions and repeating the process. Chlorite ions resulting from the reduction of chlorine dioxide are also recycled back to chlorine dioxide in the cyclic process.

As used herein, the term "chlorite ion donor" and "chlorite donor" is a compound that comprises an alkali metal salt comprising chlorite anions $ClO_2$, chlorine dioxide, or any convenient direct or indirect source of chlorite anions. For example, chlorine dioxide can indirectly produce chlorite due to reduction in an aqueous system. Sodium chlorite directly supplies chlorite anions.

As used herein, the term "chlorite ion" and "chlorite anion" (also referred to as "chlorite") comprises chlorite having the general formula $ClO_2$. The chlorite is the anion released when sodium chlorite is dissolved in water and converts to chlorine dioxide.

As used herein, the term "recycled" means at least some portion of the recovered bromide ions and chlorite ions are regenerated to their respective oxyhalogen compounds, followed by reduction back to their respective anions, and where the process is repeated.

As used herein, the term "*Cryptosporidium*" is used to represent any form of parasitic microbiological organism from the family of *Cryptosporidium*. An example of *Cryptosporidium* is *Cryptosporidium parvum* (also referred to as *C. parvum, C. parvum* and *Cryptosporidium parvum*). Other examples of *Cryptosporidium* include but are not limited to: *C. hominis, C. canis, C. felis, C. meleagridis*, and *C. muris*. It is to be noted that inclusion or exclusion of italic characters or print when referring to *Cryptosporidium* or any of its many variants does not in any way detract from its intended descriptive meaning.

As used herein, the term "microbiological organisms" is used with reference to all forms of microbiological life including: parasites, bacteria, viruses, algae, fungus, and organisms encased in biofilms.

As used herein, "parasites" includes any species of organism including *Cryptosporidium, Giardia* and Ameba that can be transferred to humans by water and cause waterborne parasitic disease in humans.

As used herein, the term "inactivation" is used with reference to the ability to deactivate, kill, or destroy microbiological organisms.

As used herein, "remediation" is defined as the ability to reduce the level of waterborne pathogens and/or algae to levels at or below that deemed acceptable by various regulatory agencies exemplified by State and local Departments of Health, U.S. Environmental Protection Agency, and/or the Centers for Disease Control and Prevention. Examples of achieving remediation comprise at least one of the following: less than 1 CFU per ml of viable bacteria determined by heterotrophic plate count; greater than or equal to a 3-log reduction of parasites, and/or rendering the aqueous system free of algae.

As used herein, "programmable controller" 24 describes a control system comprising at least a microprocessor and/or programmable logic controllers (PLC) with relays and interfaces with sensors and chemical feed systems. The operations described herein can be implemented as executable code stored on a computer or machine readable non-transitory tangible storage medium in communication with the microprocessor.

Non-limiting examples of how the programmable controller 24 can be used to control chemical feed systems 40 includes: actuating chemical feed; varying the rate of chemical feed; energizing an electronic device such as a chemical feed pump, solenoid valve; stopping chemical feed; and initiating a neutralization cycle that removes residual chemicals from the water using neutralizing chemicals exemplified by sodium sulfite. The programmable controller 24 receives inputs either manually and/or automatically from sensors exemplified by the non-limiting examples: pH sensor 12, ORP sensor 8, amperometric sensor 10, chlorine dioxide sensor 14, temperature sensor 16, flow sensor 17, flow switch and the like.

The programmable controller 24 uses some form of control logic to control and optimize the feed of chemicals. Examples of control logic include: time-proportional, proportional, derivative, integral, proportional-integral-derivative control.

As used herein, "fluid contact" describes contact between conduits 32, 33 capable of transporting liquid to and from the main body of water (i.e. swimming pool) 4 at the aquatic facility. Specifically, regarding aquatic facilities, sensors and chemical feed systems 40 are in fluid contact with the water 4 of an aquatic facility in or near the mechanical room where water is recovered from the pool, filtered 20, sometime heated 22 and returned to the pool. The piping (conduit) 36 transporting the water supplies water for the sensors to monitor the various parameters such as pH 12, sanitizer concentration 8, 10, temperature 16 and chlorine dioxide 14. Chemical feed 40 is generally applied into the return piping 33 after being filtered and where applicable heated to prevent corrosion of the heater 22.

As used herein, "chemical feed systems" 40 describe any convenient device that is fluid contact with both the chemicals and the water of the aquatic facility. The chemical feed systems 40 can be controlled to deliver the desired amount of chemicals exemplified by the non-limiting examples chlorine, bromine, acid such as HCl or $CO_2$ and sodium chlorite. Non-limiting examples of chemical feed systems include: chemical metering pumps, educators, modulating control valves, electrolysis device and the like.

As used herein, "flow sensor" 17 describes a device that can detect a liquid flowing through a pipe or conduit 36. The flow sensor 17 can be a flow transmitter that measures the flow rate, but is not required to measure the flow rate. The flow sensor 17 detects motive water in the pipe or conduit 36. One non-limiting example of a flow sensor that does not measure the flow rate is a Rotorflow® Flow Sensor available by Gems™ Sensors and Controls.

As used herein, "energize" and "energizing" and its variations describes the activation of an electrical device by closing a circuit that delivers an electrical current to the electrical device so that the electrical device performs a desired function. For example, a flow sensor detects motive water followed by the control panel energizing the chemical feed systems. In contrast, when motive water is no longer confirmed by the flow sensor, the control panel stops the chemical feed systems.

As used herein, "actuated" and "actuating" and its variations is an action initiated by the control panel to cause something to happen such as initiating chemical feed, stopping chemical feed, initiating a neutralization cycle and the like.

As used herein, the term "free chlorine" is used with reference to a chlorine source that hydrolyses in the aqueous system to produce at least some portion of hypochlorous acid and hypochlorite ions. Examples include sodium hypochlorite, calcium hypochlorite, dichloroisocyanuric acid, trichloroisocyanuric acid, lithium hypochlorite as well as electrolysis devices the convert chloride ions to free chlorine in water.

As used herein, the term "free bromine" is used with reference to the formation or presence of hypobromous acid and possibly some portion of hypobromite ions.

As used herein, the term "oxidizer" is used to describe a chemical capable of oxidizing bromide ions to form free bromine and/or chloride ions to free chlorine. The oxidizer can comprise bromide ions and/or free bromine. The oxidizer can be a sanitizer exemplified by calcium hypochlorite, sodium hypochlorite, lithium hypochlorite and the like. One non-limiting example of an oxidizer comprising bromide ion donor is TowerBrom® 90M sold by Occidental Chemical Corporation. Other non-limiting examples of oxidizers include potassium monopersulfate, trichloroisocyanurate, dichloroisocyanurate, 1-Bromo-3-chloro-5,5-dimetlaylhydantoin and the like. Electrolysis of chloride ions to produce free chlorine is also a suitable oxidizer.

As used herein, the term "inactivation" is used with reference to the ability to deactivate, kill, or destroy microbiological organisms.

As used herein, the term "microbiological organisms" is used with reference to all forms of microbiological life forms including: parasites, bacteria, viruses, algae, fungus, and organisms encased in biofilms.

As used herein, the term "free halogen donor" is used with reference to a halogen source which acts as an active oxidizer when dissolved in water. Chlorine based free halogen donors form at least one of $Cl_2$, HOCl, and $OCl^-$ (also referred to as free chlorine) when added to water, whereby the species formed is pH dependent. Bromine based free halogen donors form at least one of $Br_2$, HOBr, and $OBr^-$ (also referred to as free bromine), again the species being pH dependent.

As used herein, "sensor for controlling the feed of sanitizer" is used with reference to ORP and/or amperometric sensors that are in fluid contact with the water of an aquatic facility, and provide measurements used for controlling the feed of a sanitizer (e.g. chlorine and/or bromine). While only one sensor is used to control the sanitizer at any given time, it is beneficial to monitor both ORP and free chlorine. Also it may be advantageous to be able to switch between sensors depending on the method of remediation being employed. For example, daily remediation may best be controlled using an amperometric sensor for controlling the sanitizer to limit the concentration of sanitizer in the water. This ensures the pool can be readily opened without the need for removing excess sanitizer before opening. However, during a rapid recovery shock, it may be advantageous to increase the sanitizer concentration to accelerate the cyclic process when in-situ generation of chlorine dioxide is used. The ability to program the programmable controller to switch between sensors based on the method being used can be very beneficial.

As used herein, "amperometric sensor" 10 describes a device that is in fluid contact with the water of an aquatic facility and is used to measure the concentration of sanitizer exemplified by free chlorine. The amperometric sensor 10 can be used to control the feed of sanitizer.

As used herein, "chlorine dioxide sensor" 14 describes a device that is in fluid contact with the water 4 of an aquatic facility and is used to measure the chlorine dioxide concentrated used to remediate the aquatic facility. Generally, the chlorine dioxide sensor 14 is an amperometric sensor that incorporates a gas permeable membrane that allows chlorine dioxide gas to permeate the membrane while isolating the sensor from water soluble oxidizers like chlorine. The chlorine dioxide sensor 14 can be any suitable sensor that can be used to selectively measure the chlorine dioxide. One example of another type of chlorine dioxide sensor is a colorimetric device that utilizes lissamine green reagents to selectively measure chlorine dioxide in the presence of sanitizers.

As used herein, "ORP sensor" 8 describes a device that is in fluid contact with the water of an aquatic facility and is used to measure the Oxidation Reduction Potential (ORP) of the water 4. ORP sensor 8 can be sued to control the feed of sanitizer.

As used herein, "chemical feed systems" 40 describes in broad terms any desirable means for applying chemicals to the water 4 of an aquatic facility. Non-limiting examples of chemical feed systems include: chemical metering pumps, educators, erosion feeders such as a chlorinator or brominator.

As used herein, "Heterotrophic plate count (HPC) is also known by a number of other names, including standard plate count, total plate count, total viable count or aerobic quality count. It does not differentiate between the types of bacteria present nor does it indicate the total number of bacteria present in the water—only those capable of forming visible colonies under specified conditions on certain non-selective microbiological media. Varying the incubation temperature will favor the growth of different groups of bacteria. As it gives more meaningful information about pathogenic (disease-causing) bacteria, 35° C. (or 37° C.) is the preferred incubation temperature. HPC does not necessarily indicate microbiological safety as the bacteria isolated may not have been faecally-derived but it does give a measure of the overall general quality of the pool water, and whether the filtration and disinfection systems are operating satisfactorily. Results reported by the laboratory are traditionally expressed as colony forming units per millilitre (CFU/mL) which equates to the number of bacteria in each millilitre of the original sample of water. A HPC count of less than 1 CFU/mL indicates that the disinfection system is effective. If the count is between 10 and 100 CFU/mL, a routine investigation should be conducted as soon as possible to ensure that all the management operations are functioning properly.

As used herein, "CFU" (Colony Forming Units) is a unit used in microbiology to estimate the number of viable bacteria or fungal cells in a sample.

Once the target Ct value is achieved the remediation cycle can be terminated. The programmable controller can be programmed to automatically feed a reducing agent to the water based on the excess residual chlorine dioxide, oxidizer and/or sanitizer in the water. The approximate concentrations of said residuals can be determined by either direct measurements utilizing amperometric and chlorine dioxide sensors and/or by calculation.

Calculated residuals can be determined by knowing the relative amounts of chlorite ions and oxidizer/sanitizer applied to the swimming pool. Knowing the relative amounts of each said chemical allows for approximating the amount of reducing agent needed to neutralize the excess residuals and accelerate the process of achieving compliance with the Dept of Health regulations to reopen the pool for use.

Algorithms can be programmed into the programmable controller for achieving compliance with the Dept of Health regulations for swimming pool water quality. Once the sensors detect the swimming pool water is within the compliance, programmable controller can notify the appropriate personnel that the pool is ready for use by patrons. Controller display can signal the pool is ready for opening and/or remote communications can notify managers via a call or an app to their phones or computers.

EXAMPLES

A 15,000 gallon swimming pool in Jupiter, Florida was used as a test site for testing automated control of remediation cycles. Daily remediations were performed using accelerated remediation in the evening hours (dusk), while Rapid Recovery Shock was performed during daylight hours.

The swimming pool was equipped with a BECS Sys5 controller (also referred to as "System 5") acquired from BECS Technology, Inc. located in Saint Louis, Missouri. The System 5 controller comprised ORP, pH, amperometric and temperature sensors. A chlorine dioxide sensor with flow-cell was fitted to the BECS Sys5. The sensor was calibrated using the Palintest Kemio chlorine dioxide test kit.

Circulated water from the pool was bypassed around the filter. A side stream of water was used as source of water for the described sensors. After passing thru the sensor's flow cells, the water was discharged back to the lower pressure side (suction) of the circulating pump.

Sodium hypochlorite was the sanitizer and hydrochloric acid was used for pH control. Cryptolyte® is a trademarked source of 25% active sodium chlorite solution.

Chemical feed was controlled using the BECS Sys5 controller which controlled &/or monitored; pH (acid), free chlorine, ORP and Cryptolyte feed. Measured pool water parameters and all events such as chemical feeds were recorded in the events logs.

Chlorine dioxide concentrations were also monitored and recorded using a Crius $ClO_2$ analyzer calibrated using a Palintest Kemio chlorine dioxide test kit.

Prior to collecting Negative controls (no *Cryptosporidium* present), the pool water chemistry was tested using standard titration test kits (Taylor), conductivity meter, pH meter etc. The BECS controller was calibrated for all monitored parameters by an experienced CES technician.

Viable *Cryptosporidium parvum* was obtained from Bunch Grass Farms. The viability was tested by BCS Laboratories located in Gainesville, Fl.

Approximately 1.4 Billion *Cryptosporidium* oocyst were added to the strainer so they would be quickly distributed throughout the pool. Collection began approximately 15 minutes after addition.

A submersible pump was positions in the center of the pool and elevated to reduce collection of sediment. Collection was performed using the "Modified EPA Method 1623 using Tangential Flow Hollow-fiber Ultrafiltration. 2-Rexeed-25S (280 ml volume) single use Dialysis cartridges were used in parallel to provide duplicate samples.

Rotameters were used to regulate the flowrate thru the cartridges at a rate of approximately 3.5 liters/min.

Collection occurred over approximately 60 minutes to ensure sufficient *Cryptosporidium* was collected in each cartridge to allow for ≥4-log reduction measurement after losses from cleaning the eluted samples.

Upon completion of the collection, a solution of sodium thiosulfate was pumped using a submersible pump from a tank of sodium thiosulfate thru the cartridges at 3.5 liters/min for approximately 60 seconds providing numerous (9-12) volume turnovers. Then a sample was collected and tested for residual oxidizers using FAS-DPD reagent. After demonstrating a negative DPD result (0.0 ppm oxidant reported as $Cl_2$), the cartridges were removed and sealed, the time was noted and the cartridges were placed in ice coolers and overnight shipping to BCS Laboratories for HTC-8 testing.

Daily remediation (Maintenance) Test #1 and #2 are represented by FIG. 3 and FIG. 4 respectively. Tests consisted of an evening remediation using accelerated remediation. The chlorine, acid and sodium chlorite (Cryptolyte) relays were activated by the BECS Sys5 controller. The remediation cycle was initiated near dusk. Cryptolyte® was applied at a dosage of 0.4 lbs per 10,000 gallons of pool water (approximately 0.88 ppm as $ClO_2$). *Cryptosporidium* samples collected in the early morning upon conclusion of the accelerated remediation cycles. HTC-8 results performed on maintenance test #1 and #2 demonstrated a >4.0 log reduction in viability.

A daytime Shock Treatment Test is represented by FIG. 5. The BECS Sys5 controller activated the relays to feed chlorine, Cryptolyte® and acid into the conduit 33 of the circulating system resulting in the in-situ generation of chlorine dioxide. The chlorine dioxide concentration quickly increased then slowly dissipated resulting in >4.9 log reduction in viable *Cryptosporidium*.

The disclosed method and system achieved remediation of chlorine resistant *Cryptosporidium* accountable for nearly 80% of all Recreational Water Illness (RWI) in the United States with a high level of reproducibility and efficiency that was surprising and unexpected to the inventor and to the aquatic facility operators where tested. The disclosed invention achieved remediation with minimal capital expenditure (chemical feeders and controller upgrade) and chemical cost thereby making remediation for mitigating Recreational Water Illness (RWI) surprisingly affordable for the entire Aquatics industry.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for accelerating remediation of at least one pathogens resistant to chlorine in water of an aquatic facility, the method comprising:
    calculating a chlorine dioxide concentration time (Ct) value of the water in real time by a programmable controller;
    activating chemical feed systems by the programmable controller so that the chemical feed systems deliver an acid, an oxidizer and a chlorite ion donor to a conduit connected to the water;
    allowing the acid, the oxidizer and the chlorite ion donor to react in the conduit and form chlorine dioxide; and
    supplying the chlorine dioxide from the conduit to the water; and
    sustaining a chlorine dioxide concentration in the water until a targeted chlorine dioxide Ct value is reached to achieve remediation of the water, wherein the remediation is at least a 3-log reduction of the at least one pathogen resistant to the chlorine in the water.

2. The method according to claim 1, further comprising:
    Measuring the chlorine dioxide concentration of the water by a chlorine dioxide sensor in communication with the programmable controller; and
    recording the chlorine dioxide concentration and calculating the chlorine dioxide Ct value of the water by the programmable controller based on the chlorine dioxide concentration.

3. The method according to claim 1, further comprising:
    measuring a pH concentration of the water by a pH sensor in communication with the programmable controller; and
    controlling the pH concentration of the water by the programmable controller.

4. The method according to claim 1, further comprising:
    measuring a sanitizer concentration in the water by a sanitizer sensor in communication with the programmable controller; and
    controlling the sanitizer concentration in the water by the programmable controller.

5. The method according to claim 1, wherein the programmable controller uses an algorithm to calculate the chlorine dioxide Ct value comprising:

$$Ct\ \text{value} = [(\Sigma X_n) \div n] \times T$$

Where:

"$X_n$" is the chlorine dioxide concentration in mg/l (or ppm) recorded at a point in time since beginning a remediation cycle;

"n" is a number of chlorine dioxide values recorded over a period of time (minutes) since beginning the remediation cycle, and "T" is the period of time (minutes) that has lapsed since beginning the remediation cycle.

6. The method according to claim 1, further comprising: calculating the chlorine dioxide Ct value based on a rolling average of the chlorine dioxide concentration in the water.

7. The method according to claim 4, wherein the sanitizer sensor is an Oxidation Reduction Potential (ORP) sensor.

8. The method according to claim 4, wherein the sanitizer sensor is an amperometric sensor.

9. The method according to claim 4, wherein the sanitizer sensor includes is both an Oxidation Reduction Potential (ORP) and an amperometric sensors.

10. The method according to claim 1, wherein implementation of a remediation cycle is initiated automatically by the programmable controller.

11. The method according to claim 1, wherein implementation of a remediation cycle is initiated manually.

12. The method according to claim 1, wherein the programmable controller calculates, records, and stores the chlorine dioxide Ct value.

13. The method according to claim 1, wherein the programmable controller displays the chlorine dioxide Ct value.

14. The method according to claim 1, wherein the programmable controller terminates a remediation cycle.

15. The method according to claim 14, further comprising providing a reducing agent feed system in communication with the programmable controller, and the programmable controller adding a reducing agent from the reducing agent feed system to neutralize excess chlorine dioxide and the oxidizer in the water.

16. The method according to claim 1, wherein the oxidizer is a sanitizer.

17. The method according to claim 1, wherein the chemical feed systems to deliver the acid and the oxidizer comprises an electrolysis device.

18. A system for controlling accelerated remediation of at least one pathogens resistant to chlorine in water of an aquatic facility, the system comprising:

at least one sanitizer sensor for measuring a concentration of sanitizer in the water;

a pH sensor for measuring a pH of the water;

a temperature sensor for measuring a temperature of the water;

a chlorine dioxide sensor for measuring a chlorine dioxide concentration in the water;

chemical feed systems for supplying an acid, an oxidizer and a chlorite ion donor to a conduit in communication with the water;

a programmable controller in communication with the at least one sanitizer sensor, the pH sensor, the temperature sensor, the chlorine dioxide sensor, and the chemical feed systems;

the programmable controller is programmed to implement an accelerated remediation cycle by activating the chemical feed systems to achieve localized high concentrations of the acid, the oxidizer and the chlorite ion donor which react to form chlorine dioxide in the conduit that is supplied to the water;

the programmable controller is programmed to record the chlorine dioxide concentration measured by the chlorine dioxide sensor;

the programmable controller is programmed to calculate a chlorine dioxide concentration time (Ct) value of the water in real time; and the programmable controller is programmed to sustain the chlorine dioxide concentration in the water until a targeted chlorine dioxide Ct value is reached to achieve remediation, wherein the remediation is at least a 3-log reduction of the at least one pathogen resistant to the chlorine in the water.

19. The system according to claim 18, wherein the programmable controller is programmed to control the pH of the water.

20. The system according to claim 18, wherein the programmable controller is configured to control the concentration of sanitizer in the water.

21. The system according to claim 18, wherein the programmable controller is configured to control the pH of the water in the conduit during the accelerated remediation cycle.

22. The system according to claim 18, wherein the chemical feed systems supply reducer to the conduit, and the programmable controller is programmed to terminate the accelerated remediation cycle by activating the chemical feed systems to apply a reducing agent to the water to neutralize excess chlorine dioxide and the sanitizer in the water.

23. The system according to claim 18, wherein the programmable controller uses an algorithm to calculate the chlorine dioxide Ct value comprising:

$$Ct\ value = [(\Sigma X_n) \div n] \times T$$

Where:

"$X_n$" is the chlorine dioxide concentration in mg/l (or ppm) recorded at a point in time since beginning the accelerated remediation cycle;

"n" is a number of chlorine dioxide values recorded over a period of time (minutes) since beginning the accelerated remediation cycle, and "T" is the period of time (minutes) that has lapsed since beginning the accelerated remediation cycle.

24. The system according to claim 18, wherein the at least one pathogen is a parasite.

25. The system according to claim 24, wherein the parasite is *Cryptosporidium*.

26. The system according to claim 24, wherein the parasite is Giardia.

27. The system according to claim 24, wherein the parasite is an Ameba.

28. The system according to claim 18, wherein the at least one pathogen is a bacteria protected by biofilm.

29. The system according to claim 18, wherein the programmable controller recording chlorine dioxide concentrations of the water and calculating an average chlorine dioxide concentration in the water by dividing sum of the recorded chlorine dioxide concentrations by a number of recorded values and calculating the chlorine dioxide Ct value of the water using the average chlorine dioxide concentration.

30. The system according to claim 18, further comprising calculating the chlorine dioxide Ct value based on a rolling average of the chlorine dioxide concentration in the water.

31. The system according to claim 30, wherein the rolling average is calculated every 0.1 to 60 minutes.

32. The system according to claim 30, wherein the rolling average is calculated every 0.2 to 30 minutes.

33. The system according to claim 30, wherein the rolling average is calculated every 0.5 to 10 minutes.

34. The system according to claim 18, wherein the calculated chlorine dioxide Ct value is used to forecast when the targeted chlorine dioxide Ct value will be achieved.

35. The system according to claim 18, wherein the chlorine dioxide concentration ranges from 0.0 to 2.0 ppm as $ClO_2$ during a daily remediation.

36. The system according to claim 18, wherein the chlorine dioxide concentration ranges from 0.0 to 20 ppm as $ClO_2$ during a shock remediation.

37. The system according to claim 18, wherein the programmable controller is programmed to evaluate previous remediation cycles of the aquatic facility and project the chlorine dioxide concentration and/or application rate of the chlorine dioxide in future remediation cycles to achieve the targeted chlorine dioxide Ct value within a desired time interval unique to the aquatic facility.

38. The system according to claim 18, wherein the aquatic facility is used by humans for swimming, exercise, water sports, recreation, physical therapy, or diving.

39. The method according to claim 1, wherein the at least one pathogen is a parasite.

40. The method according to claim 39, wherein the parasite is *Cryptosporidium*.

41. The method according to claim 39, wherein the parasite is Giardia.

42. The method according to claim 39, wherein the parasite is an Ameba.

43. The method according to claim 1, wherein the at least one pathogen is a bacteria protected by biofilm.

44. The method according to claim 1, wherein the programmable controller recording chlorine dioxide concentrations of the water and calculating an average chlorine dioxide concentration in the water by dividing sum of the recorded chlorine dioxide concentrations by a number of recorded values and calculating the chlorine dioxide Ct value of the water using the average chlorine dioxide concentration.

45. The method according to claim 6, wherein the rolling average is calculated every 0.1 to 60 minutes.

46. The method according to claim 6, wherein the rolling average is calculated every 0.2 to 30 minutes.

47. The method according to claim 6, wherein the rolling average is calculated every 0.5 to 10 minutes.

48. The method according to claim 1, wherein the calculated chlorine dioxide Ct value is used to forecast when the targeted chlorine dioxide Ct value will be achieved.

49. The method according to claim 1, wherein the chlorine dioxide concentration ranges from 0.0 to 2.0 ppm as $ClO_2$ during a daily remediation.

50. The method according to claim 1, wherein the chlorine dioxide concentration ranges from 0.0 to 20 ppm as $ClO_2$ during a shock remediation.

51. The method according to claim 1, wherein the programmable controller is programmed to evaluate previous remediation cycles of the aquatic facility and project the chlorine dioxide concentration and/or application rate of the chlorine dioxide in future remediation cycles to achieve the targeted chlorine dioxide Ct value within a desired time interval unique to the aquatic facility.

52. The method according to claim 1, wherein the aquatic facility is used by humans for swimming, exercise, water sports, recreation, physical therapy, or diving.

\* \* \* \* \*